United States Patent
Sharma (10) Patent No.: US 10,611,902 B2
(45) Date of Patent: Apr. 7, 2020

(54) POROUS THERMALLY INSULATING COMPOSITIONS CONTAINING HOLLOW SILICA PARTICLES

(71) Applicant: UT-Battelle, LLC, Oak Ridge, TN (US)

(72) Inventor: Jaswinder K. Sharma, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 165 days.

(21) Appl. No.: 15/889,543

(22) Filed: Feb. 6, 2018

(65) Prior Publication Data

US 2018/0223086 A1 Aug. 9, 2018

Related U.S. Application Data

(60) Provisional application No. 62/454,968, filed on Feb. 6, 2017.

(51) Int. Cl.

| | |
|---|---|
| *C08L 25/00* | (2006.01) |
| *C08L 25/04* | (2006.01) |
| *C08L 39/06* | (2006.01) |
| *C08K 5/19* | (2006.01) |
| *C08K 3/36* | (2006.01) |
| *C08K 5/101* | (2006.01) |
| *C08L 83/02* | (2006.01) |
| *C01B 33/158* | (2006.01) |
| *C08L 83/04* | (2006.01) |
| *C01B 33/18* | (2006.01) |
| *C09D 125/06* | (2006.01) |
| *C09J 139/06* | (2006.01) |
| *C09D 7/61* | (2018.01) |
| *C09D 5/00* | (2006.01) |
| *C01B 32/152* | (2017.01) |
| *C08K 9/08* | (2006.01) |
| *C08K 9/04* | (2006.01) |
| *C08K 7/26* | (2006.01) |

(52) U.S. Cl.
CPC .......... *C08L 25/04* (2013.01); *C01B 33/1585* (2013.01); *C01B 33/18* (2013.01); *C08K 3/36* (2013.01); *C08K 5/101* (2013.01); *C08K 5/19* (2013.01); *C08L 39/06* (2013.01); *C08L 83/02* (2013.01); *C08L 83/04* (2013.01); *C09D 5/00* (2013.01); *C09D 7/61* (2018.01); *C09D 125/06* (2013.01); *C09J 139/06* (2013.01); *C01B 32/152* (2017.08); *C01P 2004/03* (2013.01); *C08K 7/26* (2013.01); *C08K 9/04* (2013.01); *C08K 9/08* (2013.01); *C08K 2201/003* (2013.01); *C08K 2201/006* (2013.01); *C08K 2201/011* (2013.01); *C08L 2201/08* (2013.01); *C08L 2205/18* (2013.01); *C08L 2207/53* (2013.01); *Y02P 20/129* (2015.11)

(58) Field of Classification Search
CPC .......... C08L 25/04; C08L 39/06; C08L 83/06; C08L 83/04; C01B 33/13; C01B 33/12; C01B 37/02; C01B 39/00; C01B 33/18; C01B 33/1585; C09D 7/61; C09D 5/00; C09D 125/06; C08K 3/36; C08K 5/101; C08K 5/19; C09J 139/06
USPC .......................................... 523/201
See application file for complete search history.

(56) References Cited

U.S. PATENT DOCUMENTS

| | | | |
|---|---|---|---|
| 2005/0244322 A1* | 11/2005 | Chen ..................... | C01B 33/113 423/335 |
| 2012/0045515 A1 | 2/2012 | Liu et al. | |

OTHER PUBLICATIONS

Sandberg et al., "Synthesis of Hollow Silica Nanospheres by Sacrificial Polystyrene Templates for Thermal Insulation Applications," Advances in Materials Science and Engineering, vol. 2013, pp. 1-6. (Year: 2013).*

Duda J.C. et al., "Exceptionally Low Thermal Conductivities of Films of the Fullerene Derivative PCBM", Physical Review Letters (Jan. 2013), vol. 110, pp. 015902-1-015902-5.

Palanikumar L. et al., "Spatiotemporally and Sequentially-Controlled Drug Release from Polymer Gatekeeper—Hollow Silica Nanoparticles", Scientific Reports (2017), pp. 1-11 DOI: 10.1038/srep46540.

Pöhls J. et al., "Origins of ultralow thermal conductivity in bulk [6,6]-phenyl-C61-butyric acid methyl ester (PCBM)", Phys. Chem. Chem. Phys. (2016), vol. 18, pp. 1185-1190 DOI: 10.1039/c5cp06575e.

(Continued)

*Primary Examiner* — Hannah J Pak (74) *Attorney, Agent, or Firm* — Scully Scott Murphy & Presser, P.C.

(57) ABSTRACT

A thermally insulating composition comprising hollow spherical silica particles and a coating of a material having a thermal conductivity of less than 0.3 W/m·K on surfaces of said silica particles. In particular embodiments, the low conductivity coating material may be a polymer, such as polystyrene or polyvinylpyrrolidone, or the low conductivity coating material may be a quaternary ammonium salt of the Formula (1), i.e., $R^1R^2R^3R^4N^+A^-$, with at least one of $R^1$, $R^2$, $R^3$, and $R^4$ being an alkyl group containing at least ten carbon atoms (and $A^-$ is a counter anion), or the low conductivity coating material may be phenyl-C61-butyric acid methyl ester covalently bound to the hollow spherical silica particles. Also described herein is a method of thermally insulating a surface by applying a coating of the thermally insulating composition, described above, onto the surface.

28 Claims, 6 Drawing Sheets

(56) References Cited

OTHER PUBLICATIONS

Zhang Y. et al., "Polymer-Coated Hollow Mesoporous Silica Nanoparticles for Triple-Responsive Drug Delivery", Applied Materials & Interfaces (2015), pp. 18179-18187 DOI: 10.1021/acsami.5b05893.
Yang J. et al., "Hollow silica nanospheres containing a silafluorene-fluorene conjugated polymer for aqueous TNT and RDX detection", The Royal Society of Chemistry (2010), 46, pp. 6804-6806 DOI: 10.1039/c0cc01906b.

* cited by examiner

POROUS THERMALLY INSULATING COMPOSITIONS CONTAINING HOLLOW SILICA PARTICLES

CROSS REFERENCE TO RELATED APPLICATION

The present application claims benefit of U.S. Provisional Application No. 62/454,968, filed on Feb. 6, 2017, all of the contents of which are incorporated herein by reference.

STATEMENT REGARDING FEDERALLY SPONSORED RESEARCH

This invention was made with government support under Prime Contract No. DE-AC05-00OR22725 awarded by the U.S. Department of Energy. The government has certain rights in the invention.

FIELD OF THE INVENTION

The present invention relates generally to thermally insulating or soundproofing compositions, and more particularly, to such compositions that are porous (e.g., by containing hollow particles) and that can be applied as a coating on a surface.

BACKGROUND OF THE INVENTION

Porous materials are highly sought after for applications ranging from catalysis, water and air purification, electrodes, and for thermal insulation. The state-of-the-art materials for thermal insulation are silica aerogels. Aerogels are >95% air and only 5% solid silica. The aerogels provide high thermal insulation because of the air trapped inside the pores and minimum solid conduction. Air has a very low thermal conductivity, e.g., 0.024 W/m·K around room temperature and 1 atmosphere (K. Stephan and A. Laesecke, "The Thermal Conductivity of Fluid Air," *J. Phys. Chem. Ref Data*, vol. 14, no. 1, pp. 227-234, 1985). When air molecules are trapped inside the small-sized pores, the thermal conductivity further decreases (A. Berge and P. Johanson, Literature review of high performance thermal insulation, Report in Buildings Physics, Chalmers University of Technology, 2012). Therefore, in porous materials, the trapped air contributes negligibly to the overall heat transfer and significant heat flow occurs through the solid network. As silica has a quite high thermal conductivity value (1.38 W/m·K), even 5% of silica network results in a substantial heat transfer. Efforts to further decrease the amount of solid silica in aerogels results in a very fragile material that becomes exceedingly difficult to handle and use in real applications.

Hollow silica particles have also been synthesized and considered for thermal insulation. The hollow particles contain a cavity filled with air and have a thin wall made of solid silica; therefore, the particles have an overall very low thermal conductivity (e.g., ~0.025-0.03 W/m·K) (L. I. C. Sandberg, T. Gao, B P. Jelle, A. Gustaysen, Synthesis of hollow silica nanospheres by sacrificial polystyrene templates for thermal insulation applications, *Advances in Materials Science and Engineering*, pp. 483651-6, 2013). However, the lower thermal conductivity provided by hollow silica particles of the art still remains unacceptably high for many applications. Thus, there would be a significant benefit in further decreasing the thermal conductivity of such porous materials.

SUMMARY OF THE INVENTION

In a first aspect, the present disclosure is directed to thermally insulating compositions containing hollow spherical silica particles and a coating of a material having a thermal conductivity of less than 0.3 W/m·K on surfaces of the silica particles. The foregoing types of compositions have herein been found to possess exceptionally low thermal conductivities. In a first set of particular embodiments, the low conductivity coating material is a polymer, such as polystyrene or polyvinylpyrrolidone. In another set of particular embodiments, the low conductivity coating material is a quaternary ammonium salt of the Formula (1), i.e., $R^1R^2R^3R^4N^+A^-$, with at least one of $R^1$, $R^2$, $R^3$, and $R^4$ being an alkyl group having at least ten carbon atoms; and $A^-$ is a counter anion. In another set of particular embodiments, the low conductivity coating material is phenyl-C61-butyric acid methyl ester that is covalently bound by an amide bond, in place of the ester group, via a linker to the surface of the hollow spherical silica particles.

In a second aspect, the present disclosure is directed to a method of thermally insulating a surface by applying a coating of the thermally insulating composition, described above, onto the surface. The surface can belong to any object or material for which thermal insulation or soundproofing is desired.

As further discussed below, hollow silica particles with a thermal conductivity of ~0.025 W/m·K (almost the same as the aerogels) were used as substrate materials. In hollow particles, the main mode of heat transfer is through the walls of the particles, as the air trapped inside the particles contributes minimally to the total thermal conductivity due to the Knudsen effect (A. Berge et al., 2012, supra). The Knudsen effect refers to energy transfer between the air molecules and the hollow particle wall instead of between air molecules. The elastic collisions between air molecules and the solid particle wall transfer less energy than collisions between gas molecules. The possibility of such molecule-to-wall collisions is very high when the cavity size is very small (smaller than the mean free path of the air molecules: 70 nm) and can be observed up to about 10 μm. The disclosed invention provides materials with exceptionally low thermal conductivities by further minimizing heat flow through the solid network portion (wall portions) of the porous silica material. The invention achieves this by incorporating a material with an inherently low thermal conductivity as a coating on hollow silica particles. The resulting porous silica materials described herein can be used for superior thermal insulation or soundproofing in, for example, buildings, vehicles, hydrogen storage, heat exchangers, water supply piping, space shuttles, automobile engines, airplanes, and waste heat energy conversion systems.

BRIEF DESCRIPTION OF THE DRAWINGS

FIGS. 5A, 5B. Transmission electron microscope (TEM) images of the precursor hollow silica particles (without any coating material), with FIGS. 5A and 5B showing average particle sizes of 300 nm and 400 nm, respectively.

DETAILED DESCRIPTION OF THE INVENTION

In a first aspect, the present disclosure is directed to a thermally insulating composition that includes hollow spherical silica particles and a coating of a material (i.e., "coating material") having a thermal conductivity of up to or less than (no more than) 0.3 W/m·K on surfaces of the hollow silica particles. In some embodiments, the coating material has a thermal conductivity of up to or less than 0.2 or 0.1 W/m·K. The term "surfaces," as used herein, refers to outer (external) surfaces of the hollow particles. The term "coating," as used herein, refers to the presence of a multiplicity of coating molecules attached to (e.g., covalently, ionically, or by hydrogen bonds or physisorption) and of sufficient quantity as to surround the surface of each hollow particle. Typically, the coating molecules are bound to each particle surface as a monolayer of such molecules. Thermal conductivity values of numerous compounds are available in the literature, e.g., (i) CRC Handbook of Chemistry and Physics, 84$^{th}$ Ed., CRC Press, Inc. (c) 2003; (ii) National Standards Reference Data System (NSRDS), Thermal Conductivity of Selected Materials, U.S. Department of Commerce (National Bureau of Standards) NBS-8, Category 5, Issued Nov. 25, 1966; (iii) P. G. Klemens (1951). "The Thermal Conductivity of Dielectric Solids at Low Temperatures". *Proc. Roy. Soc. Lond.* A 208: 108. doi:10.1098/rspa.1951. 0147; and (iv) G. K. Chan, R. E Jones (1962). "Low-Temperature Thermal Conductivity of Amorphous Solids". *Phys. Rev.* 126: 2055. doi:10.1103/PhysRev.126.2055. Thus, one skilled in the art can consult such an information source to determine the thermal conductivities of a wide variety of compounds and materials.

The silica particles are hollow by containing an encapsulated space not occupied by a solid or liquid. Generally, the hollow particles encapsulate a gas, such as air or other gas (e.g., nitrogen, argon, or krypton). Nevertheless, the present disclosure contemplates embodiments in which the hollow particles encapsulate a space under reduced pressure (i.e., less than 1 atm) or under partial vacuum (e.g., 0.1 atm or less). The silica particles are typically spherical. The term "spherical," as used herein, is meant to encompass any shape that is either perfectly or substantially spherical or approaching a spherical shape, which includes elliptical (i.e., oval) shapes, except that the elliptical shape generally has a degree of eccentricity of no more than 0.5, 0.4, 0.3, 0.2, or 0.1. The hollow silica particles generally have a mean (average) particle size of up to or less than 1000, 900, or 800 nm in diameter. The particle size generally refers to the diameter of the particle, wherein the diameter generally refers to the length through the midpoint of the particle from surface end to surface end. As the foregoing definition of the particle size includes the wall thickness, the diameter of the inner hollow portion (inner diameter) is necessarily smaller than the particle size or diameter as defined above. If not a perfect sphere, the term "diameter" generally refers to an average diameter of the short and long dimensions of the particle. In different embodiments, the hollow silica particles have a mean particle size of up to (no more than) or less than 800, 750, 700, 600, 500, 400, 300, 250, 200, 150, or 100 nm, or a particle size within a range bounded by any two of the foregoing values. The wall thickness is typically no more than 50, 40, 30, 20, 10, 5, 2, or 1 nm or within a range bounded by any two of the foregoing values.

In some embodiments, the hollow spherical particles have a substantial degree of uniformity in size. The substantial degree of uniformity is particularly advantageous for rendering the thermally insulating composition substantially or completely transparent. The degree of uniformity can be expressed as a constraint on the distribution of particle sizes relative to the average particle size. For example, in some embodiments, at least 90%, 95%, 98%, 99%, or 100% (all) of the hollow silica particles have particle sizes that are within ±20% of the mean particle size. Conversely, up to or less than 10%, 5%, 2%, 1%, or 0% of the particles may have particle sizes that are beyond ±20% of the mean particle size. As an example, a population of hollow silica particles having an average particle size of 200 nm may have a particle size distribution in which at least 90% of the particles have a size within a size range of 160-240 nm, which is within ±20% of the average particle size of 200 nm. Conversely, 10% or less (e.g., 5%, 2%, 1%, or 0%) of the particles may be permitted to have a size less than 160 nm and/or greater than 240 nm in the foregoing example.

The hollow silica particles may be porous or non-porous. Typically, as a result of the synthetic procedure, the hollow particles possess some level of porosity. For purposes of the invention, in the event the hollow particles are porous, the pores typically have a size of no more than (i.e., up to or less than) 50 nm to ensure that molecules (e.g., solvent molecules or species being bound to the particles surface) do not enter the hollow cavities of the hollow particles. The pores preferably have a size less than 50 nm, such as a size of up to or less than 40, 30, 20, 10, 5, 2, or 1 nm. In some embodiments, the pores are exclusively micropores, i.e., pore size up to or less than 2 nm or 1 nm.

Numerous and diverse methods for preparing hollow silica nanostructures are well known in the art. The synthesis of hollow silica particles is described, for example, in Zhang et al., *Angew. Chem. Int. Ed.,* 54, 932-936 (2015); Yan et al., *Scientific Reports,* 3, 1568 (2013); Nandiyanto et al., *Langmuir,* 28(23), pp. 8616-8624 (2012); Fuji et al., *Advanced Powder Technology,* 23(5), pp. 562-565 (September 2012); Chen et al., Biomaterials, 25(4), 723-7, 2004; and Hah et al., *Chem. Commun.,* pp. 1712-1713 (2003); and Luo et al., *ACS Nano* 7, 10271-10284, 2013, the contents of which are herein incorporated by reference in their entirety.

In a first embodiment, the coating material is a polymer having a thermal conductivity of no more than 0.3 W/m·K. The polymer may be, for example, polystyrene (PS) or polyvinylpyrrolidinone (PVP). In some embodiments, the PS or PVP polymer is a homopolymer, while in other embodiments the PS or PVP polymer is a copolymer, e.g., styrene-butadiene, styrene-acrylonitrile, styrene-ethylene, styrene-methacyrlate, vinypyrrolidinone-methacrylate, and vinypyrrolidinone-vinyl acetate. In some embodiments, the polymer may alternatively be, for example, a polyacrylate or polymethacrylate or copolymer thereof. In some embodiments, the polymer may alternatively be, for example, a polyurethane, polyester, polyamide, or polyurea.

In a second embodiment, the coating material is a quaternary ammonium salt having the following formula:

(1)

wherein $R^1$, $R^2$, $R^3$, and $R^4$ are alkyl groups, with at least one of $R^1$, $R^2$, $R^3$, and $R^4$ being an alkyl group containing at least ten carbon atoms, and wherein $A^-$ is a counter anion. The alkyl groups are independently straight-chained or branched alkyl groups, and may independently contain precisely or at least, for example, 1, 2, 3, 4, 5, 6, 7, 8, 9, 10, 11, 12, 13, 14, 15, 16, 17, or 18 carbon atoms, or a number of carbon atoms within a range bounded by any two of the foregoing values, except that at least one of $R^1$, $R^2$, $R^3$, and $R^4$ is an alkyl group containing at least ten carbon atoms. The alkyl group may also be or include a cycloalkyl group, such as cyclobutyl, cyclopentyl, and cyclohexyl groups. Some examples of alkyl groups include methyl, ethyl, n-propyl, isopropyl, n-butyl, isobutyl, sec-butyl, t-butyl, n-pentyl, isopentyl, neopentyl, n-hexyl, isohexyl, heptyl, octyl, nonyl, decyl, undecyl, dodecyl, tridecyl, tetradecyl, hexadecy, and octadecyl groups. In some embodiments, two, three, or all of $R^1$, $R^2$, $R^3$, and $R^4$ are alkyl groups containing at least ten carbon atoms. In some embodiments, one, two, or three of $R^1$, $R^2$, $R^3$, and $R^4$ independently contain one, two, or three carbon atoms, and one, two, or three of $R^1$, $R^2$, $R^3$, and $R^4$ independently contain at least ten carbon atoms. In some embodiments, $R^1$, $R^2$, and $R^3$ each independently contain one, two, or three carbon atoms, and $R^4$ contains at least 10, 11, 12, 13, 14, 15, 16, 17, or 18 carbon atoms. The counter anion ($A^-$) may be any of the counter anions known in the art, such as the halides (e.g., fluoride, chloride, bromide, or iodide), carboxylates (e.g., formate, acetate, trifluoroacetate, propionate, butyrate, caprylate, or benzoate), bicarbonate, and sulfonate (e.g., triflate). Some examples of quaternary ammonium species include decyltrimethylammonium, dodecyltrimethylammonium, tetradecyltrimethylammonium, hexadecyltrimethylammonium (i.e., cetyltrimethylammonium), octadecyltrimethylammonium, didecyldimethylammonium, dihexadecyldimethylammonium, tridecylmethylammonium, tritetradecylmethylammonium, tetradecylammonium, tetrahexadecylammonium, and tetraoctadecylammonium.

In a third embodiment, the coating material is phenyl-C61-butyric acid methyl ester (PCBM) that is covalently bound by an amide bond, in place of the ester group, via a linker to the surface of the hollow spherical silica particles. PCBM is known to have the following structure:

(2)

PCBM is described in, for example, J. C. Hummelen et al., *The Journal of Organic Chemistry*, 60 (3):532-538, 1995; J. C. Duda et al., *Physical Review Letters*, 110, 015902, 2013; and J.-H. Pohls et al., *Phys. Chem. Chem. Phys.*, 18, 1185, 2016, the contents of which are herein incorporated in their entirety.

The thermally insulating composition described above can be synthesized by any suitable means. First, the hollow silica particles need to be procured, either commercially or by producing them by any of the means well known in the art. Then, molecules having a thermal conductivity (individual or bulk) of up to or less than 0.3 W/m·K, as described above, are attached to surfaces of the hollow silica particles by means well known in the art. The coating molecules may be attached by covalent or non-covalent bonding. In the case of non-covalent bonding, the coating molecules may be simply contacted with the hollow particles in order for the molecules to adhere to surfaces of the hollow particles by, for example, physisorption, which may or may not include ionic and hydrogen bonding, and removal of excess coating molecules, and optional drying if a solvent was used. In the case of covalent bonding, the surfaces of the hollow particles are generally functionalized with functional groups that are capable of reacting with reactive functional groups on the coating molecules so as to form a covalent bond between the surface and the coating molecules. For example, the surfaces of the hollow silica particles may be functionalized by means well known in the art with amino groups, which may then react with amino-reactive (e.g., ester, aldehyde, ketone, or alkylhalide) functional groups present on the coating molecules. Alternatively, for example, the surfaces of the hollow silica particles may be functionalized with ester, aldehyde, ketone, or alkylhalide groups, which may then react with amino-functionalized coating molecules.

In some embodiments, in the case where the coating material is a polymer, the polymer may be synthesized in situ on the surface of the hollow silica particles. For example, in the case of polystyrene, styrene monomers (and optionally, any co-monomers, such as butadiene, acrylonitrile, methylacrylate, or methyl methacrylate) can be covalently or non-covalently coated onto surfaces of the hollow silica particles, followed by in situ polymerization, such as by exposure of the monomers to a polymerization catalyst and/or radiative curing.

In another aspect, the present disclosure is directed to a method of thermally insulating a surface. In the method, a coating of the thermally insulating composition, as described above, is applied onto the surface. The surface can belong to any object or material for which thermal insulation or soundproofing is desired. In a first embodiment, the material being coated with the thermally insulating composition is glass, wherein the glass may be part of a window or a pane or sheet of glass to be installed into or manufactured as a window or other functional object. In a second embodiment, the material being coated is a structural material, wherein the structural material is any material that may ordinarily be used to provide structure (e.g., wall, ceiling, tiles, or flooring material) to the interior space where people dwell, reside, or work. In a third embodiment, the material being coated is a paper or plastic product useful in holding a food or beverage (e.g., a cup, drinking glass, or food container). The paper or plastic product may be in the shape of the food or beverage article when coated, or the paper or plastic product may be in a raw or precursor (bulk) form when coated, and then subsequently shaped into the paper or plastic product. In a fourth embodiment, the material being coated is a fabric, particularly a fabric used in clothing. The fabric may be clothing or a textile article for which thermal insulation could be useful (e.g., a pot holder), or the fabric may be in precursor (bulk) form when coated, and then subsequently used to make the clothing or textile. In a fifth embodiment, the material being coated is a metal, such as for a metal pipe.

The thermally insulating composition can be coated onto a surface by any of the means well known in the art for applying a coating of a liquid onto a surface. The liquid composition may be, for example, brush coated (i.e., painted), spray coated, dip coated, or spin coated onto a surface. The foregoing methods are primarily suitable for coating with a liquid. For more viscous versions of the thermal insulating composition, the composition may still be applied by, for example, brush, dip, or spin coating. However, for tacky, gel-like, or rubbery versions of the thermal insulating composition, the composition may be applied by, for example, forming a film of the composition (e.g., by pouring a liquid form onto a surface or into a mold, leveling, and allowing to harden) and adhering the resulting film onto a surface. The film may be adhered by, for example, application of pressure and/or heat on the film while on the surface being coated, or by using an intermediate adhesive.

Examples have been set forth below for the purpose of illustration and to describe certain specific embodiments of the invention. However, the scope of this invention is not to be in any way limited by the examples set forth herein.

EXAMPLES

Example 1. Hollow Silica Particles Coated with PCBM

Hollow silica particles having a size of about 200-300 nm (and 10 nm shells) were synthesized by using preformed polystyrene particles as templates, followed by deposition of silica on the polystyrene particles, and finally, by dissolution of the polystyrene interiors with an organic solvent, such as toluene or by burning polystyrene core at high temperature (550° C.). The polystyrene particles were synthesized by a known method (A. B. D. Nandiyanto et al., *Colloids and Surfaces A: Physicochem. Eng. Aspects* 396 (2012) 96-105). By using polystyrene particles of different sizes, the size of the cavity in the hollow silica particles can be controlled. Similarly, by tuning the silica deposition time and amount of added silica precursor, the wall thickness of the hollow particles can be controlled.

Figure 1:
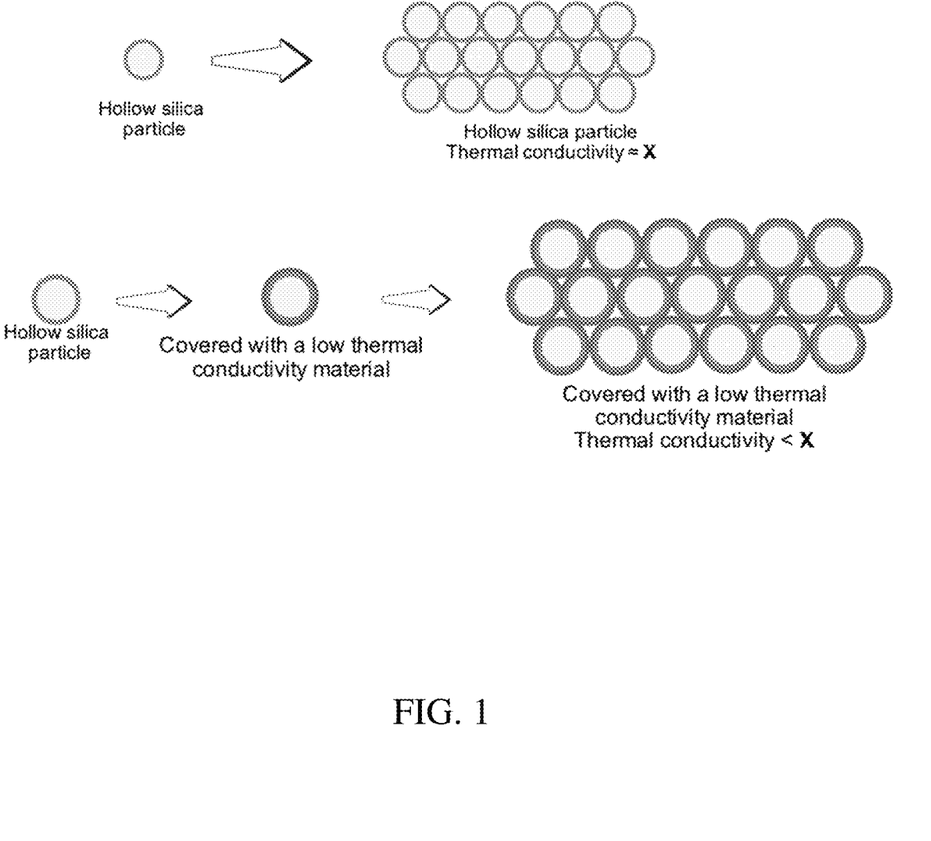
FIG. 1. Schematic diagram showing the difference in thermal conductivity outcomes when forming a conventional network of hollow silica particles (top scheme) and when forming the inventive network of hollow silica particles by coating the particles with a low thermal conductivity material (bottom scheme). The low thermal conductivity material may be, for example, PCBM or CTAB.
Figure 2:
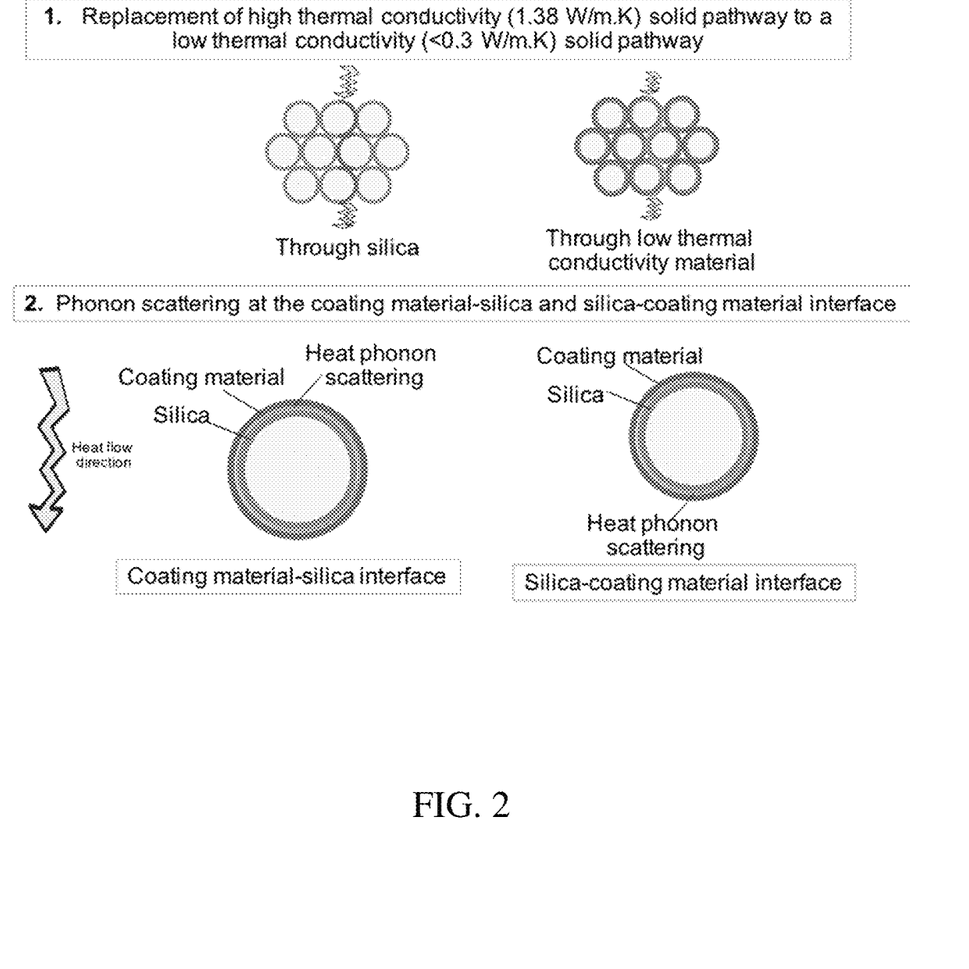
FIG. 2. Schematic drawing showing the main factors involved in reducing the thermal conductivity in the inventive composition containing hollow silica particles coated with a low conductivity material. The low thermal conductivity material may be, for example, PCBM or CTAB.

To minimize heat transfer due to solid conduction through wall-to-wall contact, hollow silica particles were coated with phenyl-C61-butyric acid methyl ester (PCBM) molecules. PCBM is a carbon material with a thermal conductivity=0.03 W/m·K (J. C. Duda et al., *Physical Review Letters*, 110, 015902, 2013). Since PCBM is a very low thermal conductivity material, heat transfer through wall-to-wall contact is significantly reduced. This results in thermal disruption of the silica network, since solid conduction through wall-to-wall contact is the main cause of heat transfer. Therefore, by replacing wall-to-wall contact between silica surfaces (~1.38 W/m·K) to a wall-to-wall contact between PCBM molecules (0.03 W/m·K), the thermal conductivity of hollow silica particles can be further reduced. Additionally, as silica and PCBM are completely different types of materials, there will be a resistance to heat flow from silica to the PCBM molecules at the silica-PCBM interface due to phonon scattering. This phonon scattering plays a further role in reducing the thermal conductivity of the material. Moreover, inclusion of PCBM at the interface can further increase the air space between particles and thus total air volume, which can further lower the thermal conductivity FIG. 1 is a schematic diagram showing the difference in thermal conductivity outcomes when forming a conventional network of hollow silica particles (top scheme) and when forming the network of coated hollow silica particles, as described herein, by coating the particles with a low thermal conductivity material (bottom scheme). FIG. 2 is a schematic drawing showing the main factors involved in reducing the thermal conductivity in the inventive composition containing hollow silica particles coated with a low conductivity material.

Figure 3:
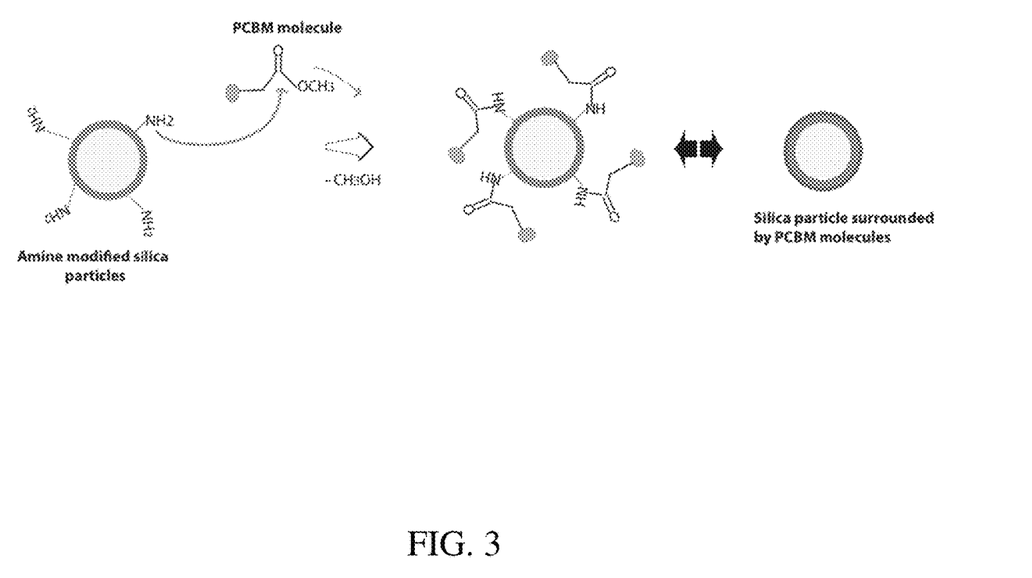
FIG. 3. Detailed schematic showing an exemplary process of covalently binding PCBM molecules onto surfaces of hollow silica particles.

FIG. 3 is a more detailed schematic showing an exemplary process of covalently attaching PCBM molecules onto surfaces of hollow silica particles. Amine modification of the hollow silica particles was achieved by first incubating the silica particles in water, and then drying. This process helps in creating sufficient hydroxy (OH) groups on the silica surfaces. In a next step, the surfaces of hollow silica particles were functionalized with amine groups by, for example, reaction of the hollow silica surfaces with an amino-functionalized alkoxysilane, e.g., 3-aminopropyltriethoxysilane (APTES). Notably, APTES can be attached to pre-fabricated silica particles or APTES may be attached to the silica surfaces during the synthesis of the hollow particles. PCBM (which contains an ester group) was attached to the amino-functionalized silica surfaces by reaction of the ester and amino groups to form amide bonds. Notably, after the hollow silica particles were surface-modified with PCBM, the originally white silica particles turned yellowish in color. The particles were once again dried. The thermal conductivity of dried particles were measured, and a value of ≈0.0265 W/m·K was observed. In the next step, the particles were added to a toluene solvent. Then a small amount of PCBM was added to the particles in the presence of a reaction catalyst. The resulting particles were washed with toluene to remove free PCBM. The particles were dried and their thermal conductivity was measured. A thermal conductivity of about 0.023 W/m·K was observed for the resulting particles. Infrared spectroscopy was used to confirm that the hollow silica particles became bound to the PCBM molecules through amide bonds.

Example 2. Hollow Silica Particles Coated with CTAB

Figure 4A:
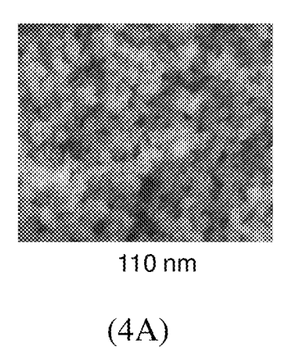
FIGS. 4A-4C. Scanning electron microscope (SEM) images of the precursor hollow silica particles (without any coating material), with FIGS. 4A, 4B, and 4C showing average particle sizes of 110 nm, 330 nm, and 450 nm, respectively.
Figure 4B:
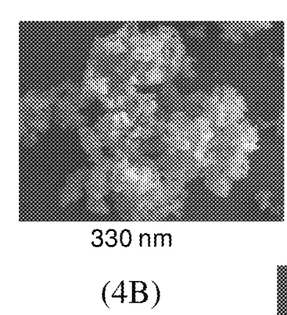
Figure 4C:
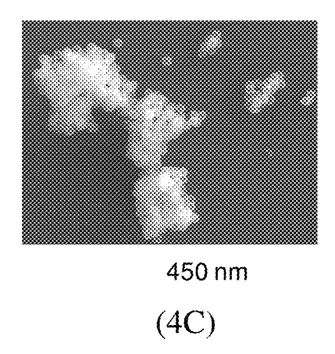

Hollow silica particles with 180 nm core and 30 nm shell were incubated in water to create hydroxy (OH) groups on the surface. The hollow particles were dried and the thermal conductivity measured. A thermal conductivity of about 0.0295 W/m·K for the hollow silica particles was observed. Scanning electron microscope (SEM) images of examples of the precursor hollow silica particles are provided in FIGS. 4A-4C, with FIGS. 4A, 4B, and 4C showing average particle sizes of 110 nm, 330 nm, and 450 nm, respectively. Transmission electron microscope (TEM) images of the hollow silica particles are provided in FIGS. 5A and 5B, with FIGS. 5A and 5B showing average particle sizes of 300 nm and 400 nm, respectively.

Figure 6:
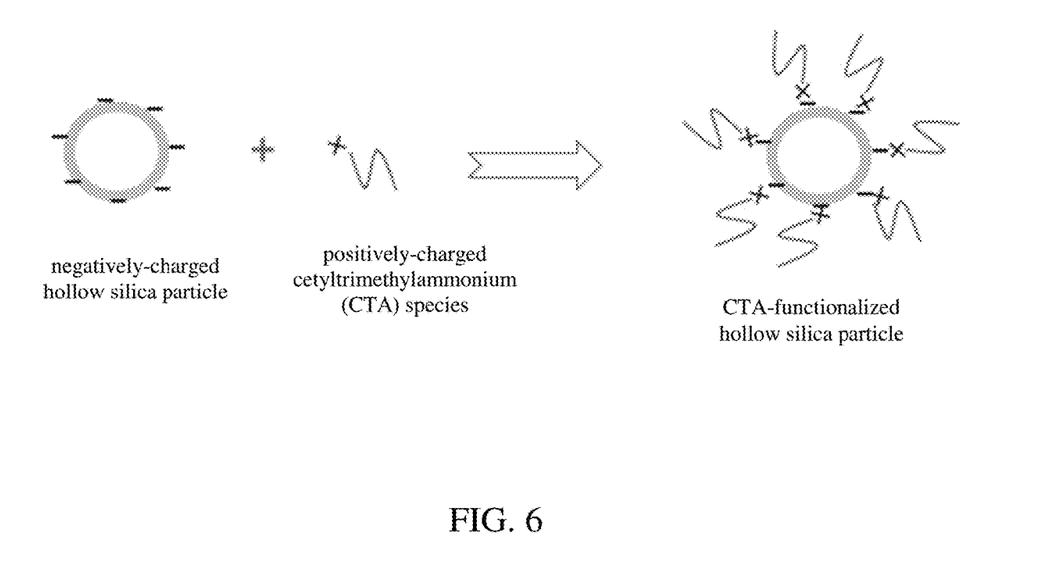
FIG. 6. A schematic showing the electrostatic binding of positively-charged portions of CTAB molecules to the surface of a negatively-charged hollow silica particle.

To the above hollow silica particles was added water, and then, after 3-4 hours, 0.7 g of cetyltrimethylammonium bromide (CTAB) was added. The particles were then washed with ethanol and a water mixture of 90% ethanol-10% water to remove the free CTAB molecules. The residue sample was dried and thermal conductivity was again measured. A thermal conductivity of about 0.026 W/m·K was observed. FIG. 6 is a schematic showing the electrostatic binding of positively-charged CTAB molecules to the surface of negatively-charged hollow silica particles.

While there have been shown and described what are at present considered the preferred embodiments of the invention, those skilled in the art may make various changes and modifications which remain within the scope of the invention defined by the appended claims.

What is claimed is:

1. A thermally insulating composition comprising hollow spherical silica particles and a coating material having a thermal conductivity of no more than 0.3 W/m·K on surfaces of said hollow spherical silica particles, wherein said coating material is selected from at least one of the following:
   (i) polymers selected from polystyrene or polyvinylpyrrolidinone;
   (ii) quaternary ammonium salt having the following formula:

(1)

wherein $R^1$, $R^2$, $R^3$, and $R^4$ are alkyl groups, with at least one of $R^1$, $R^2$, $R^3$, and $R^4$ being an alkyl group having at least ten carbon atoms; and $A^-$ is a counter anion; and
   (iii) phenyl-C61-butyric acid methyl ester that is covalently bound by an amide bond, in place of the ester group, via a linker to the surface of the hollow spherical silica particles.

2. The insulating composition of claim 1, wherein said coating material is polystyrene.

3. The insulating composition of claim 1, wherein said coating material is polyvinylpyrrolidone.

4. The insulating composition of claim 1, wherein said coating material is said quaternary ammonium salt having the formula (1).

5. The insulating composition of claim 4, wherein said quaternary ammonium salt contains a cetyltrimethylammonium portion.

6. The insulating composition of claim 1, wherein said coating is material phenyl-C61-butyric acid methyl ester that is covalently bound by an amide bond, in place of the ester group, via a linker to the surface of the hollow spherical silica particles.

7. The insulating composition of claim 1, wherein said hollow spherical silica particles have a mean particle size of up to 1000 nm.

8. The insulating composition of claim 1, wherein said hollow spherical silica particles have a mean particle size of up to 500 nm.

9. The insulating composition of claim 1, wherein said hollow spherical silica particles do not contain surface porosity.

10. The insulating composition of claim 1, wherein said hollow spherical silica particles contain surface porosity.

11. The insulating composition of claim 10, wherein said surface porosity is characterized by pores having a size of up to 50 nm.

12. The insulating composition of claim 10, wherein said surface porosity is characterized by pores having a size of up to 10 nm.

13. The insulating composition of claim 10, wherein said surface porosity is characterized by pores having a size of up to 5 nm.

14. The insulating composition of claim 10, wherein said surface porosity is characterized by pores having a size of up to 1 nm.

15. A method of thermally insulating a surface, the method comprising applying a coating of a thermally insulating composition onto said surface, wherein said thermally insulating composition comprises hollow spherical silica particles and a coating material having a thermal conductivity of less than 0.3 W/m·K on surfaces of said hollow spherical silica particles, wherein said coating material is selected from at least one of the following:
   (i) polymers selected from polystyrene or polyvinylpyrrolidinone;
   (ii) quaternary ammonium salt having the following formula:

(1)

wherein $R^1$, $R^2$, $R^3$, and $R^4$ are alkyl groups, with at least one of $R^1$, $R^2$, $R^3$, and $R^4$ being an alkyl group having at least ten carbon atoms; and $A^-$ is a counter anion; and
   (iii) phenyl-C61-butyric acid methyl ester that is covalently bound by an amide bond, in place of the ester group, via a linker to the surface of the hollow spherical silica particles.

16. The method of claim 15, wherein said coating material is polystyrene.

17. The method of claim 15, wherein said coating material is polyvinylpyrrolidone.

18. The method of claim 15, wherein said coating material is said quaternary ammonium salt having the formula (1).

19. The method of claim 18, wherein said quaternary ammonium salt contains a cetyltrimethylammonium portion.

20. The method of claim 15, wherein said coating material is phenyl-C61-butyric acid methyl ester that is covalently bound by an amide bond, in place of the ester group, via a linker to the surface of the hollow spherical silica particles.

21. The method of claim 15, wherein said hollow spherical silica particles have a mean particle size of up to 1000 nm.

22. The method of claim 15, wherein said hollow spherical silica particles have a mean particle size of up to 500 nm.

23. The method of claim 15, wherein said hollow spherical silica particles do not contain surface porosity.

24. The method of claim 15, wherein said hollow spherical silica particles contain surface porosity.

25. The method of claim 24, wherein said surface porosity is characterized by pores having a size of up to 50 nm.

26. The method of claim 24, wherein said surface porosity is characterized by pores having a size of up to 10 nm.

27. The method of claim 24, wherein said surface porosity is characterized by pores having a size of up to 5 nm.

28. The method of claim 24, wherein said surface porosity is characterized by pores having a size of up to 1 nm.

* * * * *